United States Patent [19]

Gattuso et al.

[11] Patent Number: 5,288,768
[45] Date of Patent: * Feb. 22, 1994

[54] UREA-MODIFIED ISOCYANURATES

[75] Inventors: Mark J. Gattuso, Palatine; David W. House, Arlington Heights; Ray V. Scott, Jr., Schaumburg, all of Ill.

[73] Assignee: UOP, Des Plaines, Ill.

[*] Notice: The portion of the term of this patent subsequent to Aug. 3, 2010 has been disclaimed.

[21] Appl. No.: 994,016

[22] Filed: Dec. 21, 1992

Related U.S. Application Data

[63] Continuation-in-part of Ser. No. 813,559, Dec. 26, 1991, Pat. No. 5,223,551.

[51] Int. Cl.$^5$ ............................................. C08G 18/32
[52] U.S. Cl. ..................................... 521/163; 521/161; 521/902
[58] Field of Search ...................... 521/161, 163, 902

[56] References Cited

U.S. PATENT DOCUMENTS

| | | | |
|---|---|---|---|
| 3,846,351 | 11/1974 | Huffaker et al. | 521/163 |
| 4,425,446 | 1/1984 | Malwitz et al. | 521/108 |
| 4,578,446 | 3/1986 | House et al. | 528/64 |
| 4,801,674 | 1/1989 | Scott, Jr. et al. | 528/68 |
| 5,223,551 | 6/1993 | Gattuso | 521/163 |

FOREIGN PATENT DOCUMENTS 126460 7/1977 German Democratic Rep. .

OTHER PUBLICATIONS

Ashida, Polyisocyanurate Foams, Chap. 6, *The Handbook of Polymeric Foams and Foam Technology*, edited by D. Klempner and K. C. Frisch, Hauser Publishers, 1991, p. 96.
Ashida, ibid, pp. 97–98.
Gattuso et al., *Secondary Amine Extended Flexible Polyurethane–Urea Foams*, 88, Proceedings of the S.P.I. 31st Annual Technical/Marketing Conference, Oct. 19–21, 1988.
"The ICI Polyurethanes Book", J. Wiley and Sons, 1987, pp. 29–34).

*Primary Examiner*—John Kight, III
*Assistant Examiner*—Rachel Johnson
*Attorney, Agent, or Firm*—Thomas K. McBride; Eugene I. Snyder

[57] ABSTRACT

Rigid urea-modified polyisocyanurate foams with improved dimensional stability and flame retardancy have densities of 0.5–20 p.c.f., a limiting oxygen index greater than 22 and dimensional changes at 100% R.H. and 70° C. of less than 2% in any linear dimension and a method of making same. The method comprises reacting an organic polyisocyanate, a blowing agent and an N,N′-dialkyl aromatic diamine in the presence of a trimerization catalyst and, if water is used as the blowing agent, a blowing catalyst, wherein the N,N′-dialkyl aromatic diamine and an amine produced by water, if used, constitute the sole sources of active hydrogen.

10 Claims, No Drawings

UREA-MODIFIED ISOCYANURATES

CROSS REFERENCE TO RELATED APPLICATIONS

This application is a continuation-in-part of application, Ser. No. 07/813,559, filed Dec. 26, 1991, issued as U.S. Pat. No. 5,223,551, Jun. 29, 1993, all of which is hereby incorporated by reference.

FIELD OF THE INVENTION

The present invention relates to rigid polymeric foams. Specifically, the invention relates to urea-modified isocyanurate rigid foams and a method for making such foams.

BACKGROUND OF THE INVENTION

Rigid polyurethane foams are recognized as excellent thermal insulation materials. Yet, they are not truly flame retardant. Isocyanurate foams are considerably more flame-retarding, but the unmodified foams made therefrom are highly cross-linked and are extremely brittle. Previous attempts have been made to reduce the brittleness of the isocyanurate foams by employing modifiers to reduce the amount of cross-linking. For example, flame-retardant urethane-modified polyisocyanurate rigid foams have been known since 1966 (Ashida, Polyisocyanurate Foams, Chap. 6, *The Handbook of Polymeric Foams and Foam Technology*, edited by D. Klempner and K. C. Frisch, Hauser Publishers, 1991, p 96); also amide-, carbodiimide- and imide-oxazolidone-modified polyisocyanurate foams. Ashida, ibid, p 97-8. Heat resistant and flame-retardant polyisocyanurate-polyurea foams prepared by reaction of diisocyanates with aqueous solutions of trimerization catalysts were disclosed in East German Patent 126,460. Urea-modified isocyanurate foams were disclosed in U.S. Pat. No. 4,425,446. The disclosed foams were useful in retrofitting wall cavities with insulating material, in that the material was substantially completely risen before setting or gelling. The urea-linkages were formed by an initial reaction between water and a multifunctional isocyanate which causes early rising of the foam. Additionally, the patentee discloses further modification of the formulation by the addition of a primary or secondary terminated polyamine, to form additional urea linkages. The polyisocyanurates of the present invention have rise times which exceed their gel times and set times.

Secondary amines have previously been proposed as curing agents for TDI-based flexible polyurethane foams, Gattuso et al *Secondary Amine Extended Flexible Polyurethane-Urea Foams*, Polyurethanes 88, Proceedings of the S.P.I. 31st Annual Technical/Marketing Conference, Oct. 19-21, 1988.

U.S. Pat. No. 3,846,351 describes the use of secondary phenylene diamines in combination with polyols as catalysts and chain extenders in the production of flexible polyurethane foams. More recently, it has been shown in U.S. Pat. No. 4,578,446 to House et al that N-alkylated methylenedianilines are suitable curing agents for urethane prepolymers, i.e., in elastomer production via non-RIM processes. In U.S. Pat. No. 4,801,674 to Scott et al, N-alkylated methylene dianilines are disclosed as suitable curing agents for RIM applications. However, neither patent discloses the unexpected beneficial results achieved with the rigid polyisocyanurate foams of the present invention.

SUMMARY OF THE INVENTION

The invention relates to a rigid urea-modified polyisocyanurate composition with improved dimensional stability and flame retardency and a method for making the same. The method for making a dimensionally stable rigid urea-modified polyisocyanurate having a density of from 0.5-20 p.c.f., dimensional stability at 100% relative humidity (R.H.) and 70° C. of less than 2% change in linear dimension in any direction and a limiting oxygen index (L.O.I) greater than 22 comprises reacting an organic polyisocyanate and an N,N'-disubstituted aromatic diamine having the structure

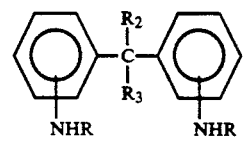

where R is selected from the group consisting of monovalent alkyl- or alkenyl moieties containing from 3 to about 20 carbon atoms and monovalent aromatic moieties containing from 6 to about 10 carbon atoms, and $R_2$, $R_3$ are independently selected from the group consisting of hydrogen and alkyl moieties containing 1 to 3 carbon atoms, and where the relative amount of polyisocyanate and aromatic diamine is such that the NCO/NH ratio is from 1 to 9. The reaction is effected in the presence of a catalytically effective amount of a first catalyst which catalyzes the blowing reaction between an isocyanate and water, if water is used as a blowing agent, and a second trimerization catalyst which catalyzes the formation of the isocyanurate ring,

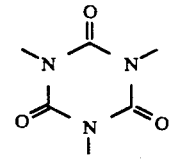

The diamine and the amine produced by water, if used as a blowing agent, constitute the sole sources of active hydrogen.

The foams of the invention are commercially desirable because of their reduced flammability, lower friability, excellent insulating properties and dimensional stability compared to available polyisocyanurate foams. Also important is the greater isotropicity imparted to the rigid foams through the use of specific N,N'-di-sec-alkyl-substituted aromatic diamines, i.e., the greater uniformity of load-bearing properties between the directions, parallel to rise and perpendicular to rise.

In a preferred embodiment the invention relates to a dimensionally stable, rigid urea-modified polyisocyanurate having substantially no urethane linkages and a density of 1.5-6 pounds per cubic foot.

DETAILED DESCRIPTION OF THE INVENTION

Although rigid foam polyisocyanurates modified only by urea linkages have been proposed for the application in retrofitting wall cavities with insulating material, a reaction in which the gel time is longer than the initial rise time is required. Moreover, there is no requirement for dimensional stability since the walls provide the necessary boundaries and warping or shrinking after installation is of relatively minor importance.

On the other hand, it is essential to the production of uniform insulating panels for original building construction that the panels be dimensionally stable after their formation and not be subject to shrinkage or warping or aging. This latter objective is achieved by reacting a polyfunctional isocyanate composition primarily with a polyfunctional amine in the presence of a blowing catalyst and a trimerization catalyst to produce a rigid isocyanurate foam. A major amount of the urea linkages in the final rigid foam is derived from the polyfunctional amine, although if water is used as a blowing agent, alone or with other known blowing agents, it will react with the polyfunctional isocyanate to produce a primary amine which can subsequently react with an isocyanate moiety to afford additional urea linkages. In any case, it is important that the amines, and optionally water as a blowing agent, are the sole source of active hydrogen, i.e., the sole isocyanate-reactive materials in the reaction mixture to avoid the formation of other types of linkages in the final rigid foams, such as urethane linkages which arise via reactions with, e.g., polyols. A first catalyst, such as those known in the art as blowing catalysts, is incorporated in the reaction mixture if water is used as a blowing agent. A second catalyst known for promoting the trimerization reaction to produce an isocyanurate is also incorporated in the reaction mixture. Where water is present, the initial reaction taking place, catalyzed by the blowing catalyst, is between the water and the polyfunctional isocyanate to form a primary amine. The primary amine, if water is present, and the disecondary aromatic diamines of this invention react with additional polyfunctional isocyanate molecules to produce an isocyanate-capped substituted urea intermediate compound in the following manner:

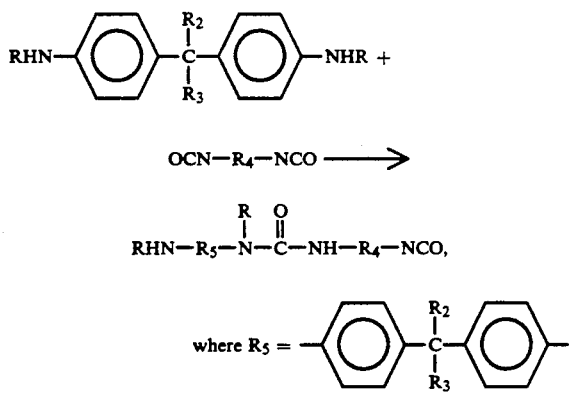

and OCN—R$_4$—NCO is a polyisocyanate of this invention, and R, R$_2$ and R$_3$ are as defined hereinbefore. Another reaction which occurs, catalyzed by the trimerization catalyst, is formation of the isocyanurate ring according to the reaction,

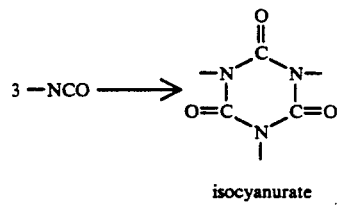

isocyanurate

The incorporation of water in the reaction mixture as the blowing agent is in an amount from about 0.1 up to about 6.0 parts per 100 parts isocyanate when used alone. The reaction of water and an isocyanate moiety leads to the formation of additional urea linkages in the final foam product and produces carbon dioxide to form the cells of the foam. Alternatively, part or all of the water may be replaced by a conventional blowing agent such as chlorofluorocarbons (CFC's), hydrochlorofluorocarbons (HCFC's), hydrofluoroalkanes (HFA), acetone, methylenechloride, methylchloroform, etc. "Handbook for Reducing and Eliminating CFC's in Flexible Polyurethane Foams", EPA Publication 21A-4002, April 1991, page 21 et seq. Where water is used only in part as the blowing agent it may be used in amounts as little as 0.1 parts per 100 parts isocyanate.

The product is a rigid urea-modified isocyanurate foam having substantially no urethane linkages, excellent insulating properties, is non-friable and exhibits flame retardance, dimensional stability on aging and a density of 0.5 to 20 p.c.f., usually 1 to 12 p.c.f., preferably 2 to 8 p.c.f. and most preferably 1.5 to 6 p.c.f.

Flame retardancy, as measured by the Butler Chimney Test, is excellent and is in the range 71% to 98%.

Multi-functional isocyanates which can be used in the invention are well known in the production of polyurethanes and polyureas and include monomers and polymers containing at least two isocyanate groups. Thus, diisocyanates and higher functionality polyisocyanates are intended and include both aliphatic and aromatic multifunctional isocyanates such as 2,4- and 2,6-toluene diisocyanate and mixtures thereof (inclusively referred to sometimes as TDI); diphenylmethane diisocyanate (MDI), polymeric MDI (PAPI-27) and modified MDI.

Blowing catalysts are well known in the art and need not be discussed at length herein. It is important that catalysts used in the present invention provide a reaction profile such that the blowing reaction of water and the multifunctional isocyanate is more rapid than the trimerization reaction and is substantially complete prior to the formation of the isocyanurate. Blowing catalysts meeting this criterion also are well known to those in the art and include bis-dimethyl aminoethyl ether (NIAX A-1 sold by Union Carbide), dimethylaminoethoxylethanol, N,N-dimethyl-3-[2-dimethyl amino ethoxy] propylamine, (Thancat DD sold by Texaco), and triethylene diamine (Dabco 33LV).

Trimerization catalysts are also well known. In the present invention, the formation of isocyanurates takes place after the urea reaction has been substantially completed. Any of the conventional trimerization catalysts well known in the art can be used in the invention including as representative examples TMR-2 from Air Products, substituted triazines, such as Polycat 41 from Air Products, alkali metal salts of organic acids such as sodium or potassium octanoate, hexanoate, or laurate, and phospholines, etc.

The sole isocyanate-reactive component (i.e., sole source of active hydrogen), except when water is used as the blowing agent, is an N,N'-disubstituted aromatic secondary diamine of the following structure,

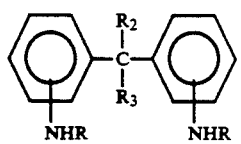

where R is selected from the group consisting of a monovalent alkyl or - alkenyl moieties containing from 3 to about 20 carbon atoms or a monovalent aromatic moiety containing from 6 to about 10 carbon atoms, and each of $R_2$ and $R_3$ is H or an alkyl moiety having 1 to 3 carbon atoms. The amount of diamine added to the multi-functional isocyanate is determined by the isocyanate/amine ratio, NCO/NH, and can be from about 1 to about 9, and is preferably 3–7.

Preferred R groups are secondary alkyl and, of these, the secondary butyl group is especially preferred. Examples of secondary and tertiary alkyl groups which may be used in the practice of this invention include iso-propyl, -sec-butyl, sec-pentyl, sec-hexyl, sec-heptyl, sec-octyl, sec-nonyl-sec-decyl, sec-undecyl, sec-dodecyl, sec-tridecyl, sec-tetradecyl, sec-pentadecyl, sec-hexadecyl, sec-heptadecyl, sec-octadecyl, sec-nonadecyl, and sec-eicosyl moieties. Examples of secondary alkenyl groups are the unsaturated counterparts of the aforementioned alkyl groups. Tertiary alkyl or alkenyl groups, i.e., those which are fully substituted at the carbon atom bound to the nitrogen may be useful in the practice of this invention, but there is the risk that the size and/or shape of the molecule may prevent the reaction or slow it down due to hindrance.

Additionally, the diamines can be blends of the above diamines or can be blended with another secondary diamine having a single aromatic ring with the following structural formula

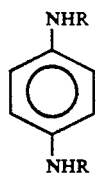

where R is selected from the group consisting of a monovalent alkyl- or alkenyl moiety containing from 3 to about 20 carbon atoms or a monovalent aromatic moiety containing from 6 to about 10 carbon atoms. Exemplary compounds useful in blends, in addition to the previously mentioned dianiline compounds are N,N'-di-sec-butyl-p-phenylene diamine and N,N'-di-sec-octyl-p-phenylene diamine.

The urea-modified polyisocyanurates are obtained by the following procedure. The reactants, including auxiliaries, are mixed in a conventional manner by bringing the "A-side", comprising the multi-functional isocyanate, into contact with the "B-side", comprising the remaining reactants, catalysts, curing agents, blowing gents, combustibility modifiers, surfactants, etc., into contact in a nozzle and directed onto a conveyor or into a mold. The foam cures in from about 12 to 18 hours and, preferably overnight at ambient temperatures.

The mixture of isocyanate-reactive components also may contain other materials, such as surfactants, combustibility modifiers, curing agents, etc. Examples of surfactants include the sodium salts of sulfonates or of fatty acids, amine salts of fatty acids, alkali metal or ammonium salts of sulfonic acids, polyether siloxanes, and the like. The component mixture also may contain pigments, dyes, flame retardants, stabilizers, plasticizers, fungicides and bactericides, and fillers.

The composition of the foams of this invention result from several reactions, and although the chemistry of each reaction is basically quite simple the multiplicity of reaction paths makes formulation of the resulting foam quite complicated. What we shall do below is to express separately the various reactions which can occur, which ultimately will permit some formulation of the resulting foam.

In the first instance let us deal with that branch of our invention where water is not used as the blowing agent, i.e., the secondary amines of our invention are the sole source of active hydrogen. The polyisocyanate is represented for convenience as a diisocyanate, OCN-$R_4$-NCO, and the aromatic diamine is represented as RNH-$R_5$-NHR.

A. Reaction of isocyanate with aromatic diamine; product I

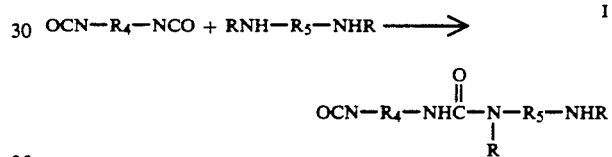

B. Reaction of aromatic diamine with product I; product II

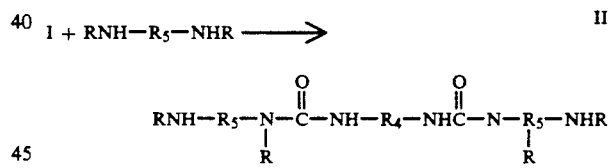

C. Reaction of isocyanate with product I; product III

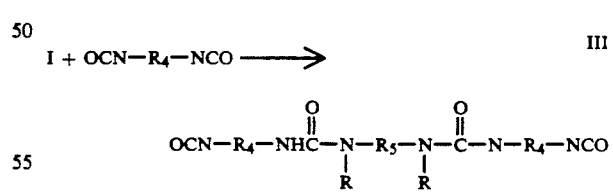

D. Trimerization of isocyanate; product IV

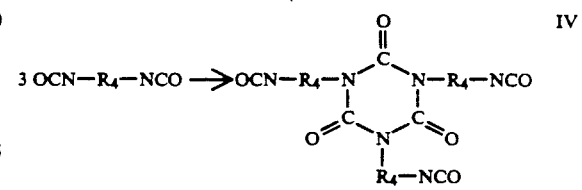

E. Trimerization of I; product V

3I ⟶

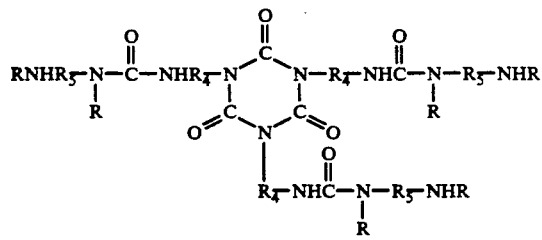

F. Reaction of IV with aromatic diamine; products V-VII

IV + RNHR₅NHR ⟶

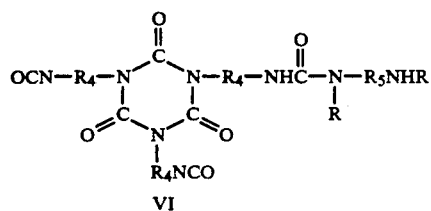

VI

+2RNHR₅NHR ⟶

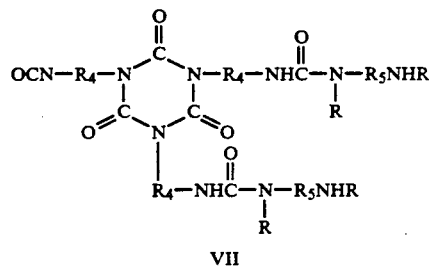

VII

+3RNHR₅NHR ⟶ V

G. Chain extension; reaction of IV+V as representative

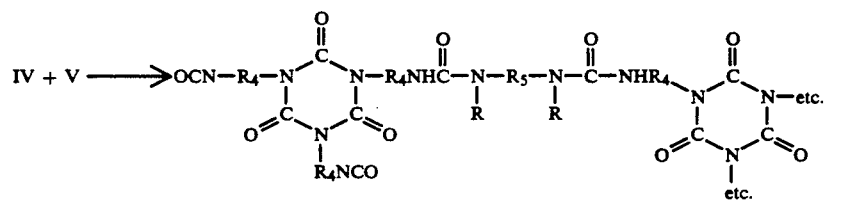

H. Chain extension; reaction of isocyanate with II

OCN—R₄—NCO +

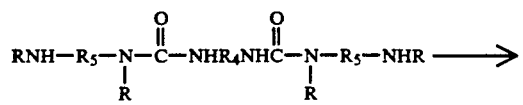 ⟶

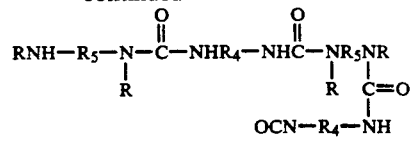

From the foregoing it can be seen that chain extension via path H leads to a polymer

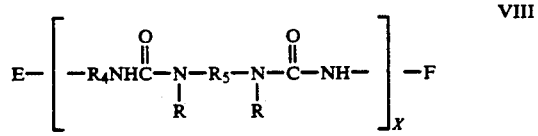

Where the repeating unit is the structure within brackets, and the end-capping unit E is OCN— or RNHR₅N(R)C(O)NH— and F is —R₄NCO or —R₄NHC(O)N(R)R₅NHR.

Similarly, but rather more complicatedly, is the chain extension via G,

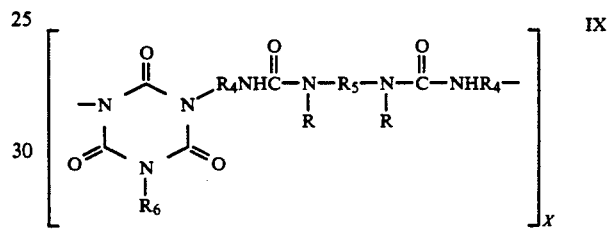

where the repeating unit is the structure within brackets. The third nitrogen in IX also may participate in chain extension, - a branch leading to crosslinking - or it may be capped by structures such as —R₄NCO and R₄NHC(O)N(R)R₅NHR.

Since IV and V are trifunctional, ample opportunities for crosslinking occur. That is, reaction between functional groups carried on different polymer chains links the chains, which is precisely the meaning of the term crosslinking.

In the instance when water is used as the blowing agent the structural representation of the final product becomes even more complicated, because the aromatic diamine RNHR₅NHR is no longer the sole source of active hydrogen, and because other amines which may form contain primary amino moieties, each one of which may react with more than one isocyanate moiety. The primary amines are generated by reaction of water with the isocyanate moiety according to the following representative (but not exhaustive) equations.

OCN—R₄—NCO + H₂O ⟶ OCN—R₄—NH₂ + CO₂

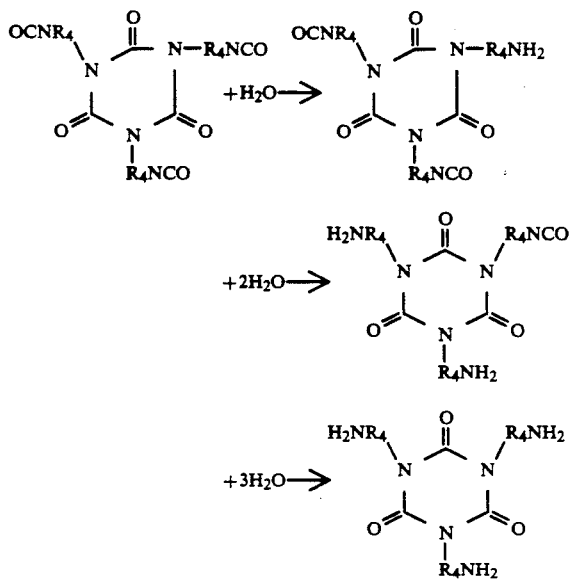

Each of the aforegoing amines also can react with any reactant or product bearing an isocyanate group, which can be readily appreciated to greatly increase the number and diversity of polymeric products. However, since only a small amount of water is used relative to aromatic diamine, in fact only few structural units arise which are attributable to reactions with primary amino moieties.

In summary, then, the polyureas of this invention are characterized by the presence of repeating units VIII and IX, where OCN—$R_4$—NCO is selected from the group consisting of 2,4-toluenediisocyanate, 2,6-toluenediisocyanate, 4,4'-diisocyanatodiphenylmethane (diphenylmethane diisocyanate, or MDI), the 2,4'-and 2,2'-isomers of MDI, polymeric MDI and modified MDI (see "The ICI Polyurethanes Book", J. Wiley and Sons, 1987, pp. 29-34).

EXAMPLES

General Preparation of the Polyurethane Foams. The procedure illustrates formulations based on the one-shot method; however, with minor modifications, it can be used in a two-stage process. The MDI-based isocyanate, PAPI 27, a widely used isocyanate for foams, which is a polymeric MDI (PMDI), is used to illustrate the invention, but other MDI-based isocyanates are available and may be used in the invention. The functionality of PAPI 27 is about 2.7.

Laboratory Scale. The diamine(s) of the examples, catalysts, foam stabilizers, water, and/or other blowing agents, and any other additives or auxiliaries were mixed by hand. The polyisocyanate, weighed out separately, was then added to the cup containing the mixture of isocyanate-reactive components and was thoroughly blended. This mixture was poured into a carboard box and allowed to rise freely. The cream time, gel time and rise time were recorded. These samples were allowed to post-cure for one week at ambient temperature before testing.

Large Scale. The formulations below may also be used on a large scale by using low and high pressure foam machines, mixing machines which may or may not be attached to sprayers, and reaction injection molding machines.

Mechanical Properties. The mechanical properties of the foams produced in the following examples are determined by the following ASTM method Nos. (D-1622-63) density; compressive strength (D-1621-64) dimensional stability (D-2126-75); K factor (D-257-76) and percent closed cells (D-2856). Flammability is defined by the Butler Chimney Test (ASTM No. D-3014-76) or Limiting Oxygen Index (LOI) (ASTM #D-2863-77). Friability is measured by ASTM #C-421-77.

EXAMPLE I

Each of the formulation in Table 1 were used to make a rigid foam according to the invention. The blowing agent in samples 1 and 4 was CFC (F11A); HCFC 123 and HCFC 141b were used in Samples 2 and 3, respectively. The NCO/NH ratio was increased to 7 in Sample #4, using CFC-11 as the blowing agent to further decrease density. The sole source of active hydrogen in these samples is N,N'-di-sec-butyl-4,4'-methylene dianiline (Unilink® 4200 available from UOP). The NCO/NH ratio was high (5) so that the foams contained only urea and isocyanurate linkages. The results shown in Table I indicate that the product foams were highly fire resistant (LOI as high as 27.5% and Bulter Chimney Values up to 96.5%, and more isotropic than conventional rigid foams containing other linkages, such as urethane, etc., linkages.

TABLE 1

| Formulation and Properties of Urea-Isocyanurate Foams (Physical Blowing Agent) | | | | |
|---|---|---|---|---|
| | Sample No. | | | |
| Formulation | 1 | 2 | 3 | 4 |
| PAPI 27 PMDI | 134 | 134.0 | 134.0 | 134.0 |
| Unilink 4200 | 31.0 | 31.0 | 31.0 | 22.1 |
| L-5421-Silicone Surfactant | 2.0 | 31.0 | 31.0 | 22.1 |
| TMR-2 (Dabco) Trimerization Catalyst | 2.0 | 2.0 | 2.0 | 2.0 |
| CFC-11 | 20 | 0 | 0 | 35. |
| HCFC-123 | | 20 | 0 | 0 |
| HCFC-141b | | 0 | 20 | 0 |
| NCO/NH Ratio | 5 | 5 | 5 | 7 |
| Reaction Profile | | | | |
| Cream Time (sec) | 13 | 13 | 13 | 16 |
| Rise Time (sec) | 31 | 40 | 63 | 47 |
| Physical Properties | | | | |
| Density, Kg/m³(p.c.f.) | 41.9(2.6) | 54.4(3.4) | 36.6(2.3) | 29.6(1.9) |
| Compressive Strength, KPa (psi) | | | | |
| Parallel to rise | 269.8(39.1) | 311.8(45.2) | 156.6(22.7) | 110.4(16.0) |

TABLE 1-continued
Formulation and Properties of Urea-Isocyanurate Foams
(Physical Blowing Agent)

| Formulation | Sample No. | | | |
|---|---|---|---|---|
| | 1 | 2 | 3 | 4 |
| Perpendicular to rise | 151.8(22.0) | 178.1(25.9) | 90.3(13.1) | 69.0(10.0) |
| Coefficient of isotropicity Index (C.I.I.) | 1.8 | 1.8 | 1.7 | 1.6 |
| K-Factor, W/mK (BTU in/ft²hr °F.) | | | | |
| Initial | 0.022(0.159) | 0.021(0.151) | 0.027(0.189) | 0.029(0.199) |
| Flammability | | | | |
| Butler Chimney (% wt. remained) | 89 | 95.0 | 96.5 | 79 |
| Oxygen Index | 26.0 | 27.0 | 27.5 | 24.0 |
| Friability (% wt. loss) | 12.0 | 8.1 | 7.3 | 33.0 |
| Dimensional Stability (Percent Dimensional Change) 50% R.H. at 70° C. | | | | |
| after 24 hr. | | | | |
| a | | | | 0.25 |
| b | | | | 0.0 |
| c | | | | 0.35 |
| vol | | | | 0.6 |
| after 1 week | | | | |
| a | | | | 0.63 |
| b | | | | 1.01 |
| c | | | | 1.75 |
| vol | | | | 3.5 |

1. polymeric diphenylmethane diisocyanate
2. N,N-di-sec-butyl-4,4'-methylene dianiline

EXAMPLE II

The additional samples were prepared, in the same way as Example I, using water as the blowing agent, at NCO/NH ratios of 3, 5 and 7, respectively, in Sample Nos. 1, 2, and 3. The results are shown in the following Table 2, indicating good dimensional stability and flame resistance, very low K-factors. Sample No. 4 was prepared using 50% water/50% CFC-11 blowing agents at NCO/NH ratio of 7. Compressive strengths and isotropicity index were good to excellent.

TABLE 2

| Formulation | Sample No. | | | |
|---|---|---|---|---|
| | 1 | 2 | 3 | 4 |
| Blowing Agent (% Water) | 100% | 100% | 100% | 50% |
| PAPI 27 PMDI | 201 | 200 | 202 | 168 |
| Unilink 4200 | 51.6 | 31.0 | 22.1 | 22.1 |
| DC-5098 | 3.0 | 3.0 | 3.0 | 3.0 |
| TMR-2 (Dabco) | 1.5 | 1.5 | 1.5 | 1.5 |
| Polycat 41 | 0.5 | 0.5 | 0.5 | 0.5 |
| Dabco T-12 | 0.1 | 0.1 | 0.1 | 0.1 |
| Water | 4.5 | 4.4 | 4.6 | 2.3 |
| CFC-11 | 0 | 0 | 0 | 17.5 |
| NCO/NH ratio | 3 | 5 | 7 | 7 |
| Appearance | ok | ok | ok | ok |
| Reaction Profile | | | | |
| Cream Time (sec) | 9 | 9 | 8 | 9 |
| Gel Time (sec) | 48 | 51 | 51 | 57 |
| Rise Time | 76 | 66 | 69 | 71 |
| Physical Properties | | | | |
| Density, Kg/m³ | 2.1 (33.6) | 1.94 (31.0) | 1.97 (31.5) | 1.98 (31.7) |
| K-Factor, BTU in/ft²hr °F.) | | | | |
| Initial | 0.194 | 0.182 | 0.186 | 0.184 |
| After 48 hrs. | 0.213 | 0.208 | 0.211 | 0.190 |
| After 1 week | 0.213 | 0.233 | 0.246 | 0.210 |
| Compressive Strength, (psi) | | | | |
| Parallel to rise | 22.3 | 22.4 | 17.7 | 29.6 |
| Perpendicular to rise | 19.0 | 19.4 | 14.9 | 15.9 |
| Coefficient of isotropicity Index (C.I.I.) | 1.2 | 1.2 | 1.2 | 1.9 |
| Flame Retardancy | | | | |
| Butler Chimney (% wt. remained) | 80 | 78 | 81 | 80 |
| Oxygen Index | 22 | 22.5 | 23.5 | 24.0 |
| Friability (% wt. loss) | 20 | 36 | 34 | 41 |
| % Closed Cell | 81 | 67 | 86 | 78 |
| Dimensional Stability (Percent Dimensional Change) (100% R.H. at 70° C.) | | | | |
| After 24 hours | | | | |
| a | −0.6 | −0.2 | −0.4 | 0 |
| b | −0.4 | −0.6 | −0.4 | −0.8 |
| c | −0.4 | −0.4 | −0.2 | −1.0 |
| vol | −1.3 | −1.1 | −1.0 | −1.7 |
| After 1 week | | | | |
| a | −0.6 | 0.8 | −0.4 | 0 |
| b | −0.6 | 0.6 | −0.4 | −0.8 |
| c | −0.4 | 0.4 | −0.6 | −0.8 |
| vol | −1.5 | −1.7 | −1.3 | −1.5 |

EXAMPLE III

Three additional samples were prepared using a different diamine, N,N'-di-sec-octyl-methylene dianiline (UL-8100) in Sample #1, and blends of N,N'-di-sec-butyl-methylene dianiline (UL-4200 from UOP) with N,N'-di-sec-butyl-4,4'-phenylene diamine (UL-4100) (Sample #2) and di-sec-octyl-methylene dianiline (Sample #3). The formulations and results are shown in the following Table 3.

TABLE 3

Urea-modified Isocyanurate Foams Using Unilink 8100

| Formulation | 1 (8100) | 2 (4200-4100) | 3 (8100-4200) |
|---|---|---|---|
| PAPI 27 | 191 | 134 | 200 |
| UL-8100 | 33.2 | 0 | 17.2 |
| UL-4200 | 0 | 20.7 | 34.4 |
| UL-4100 | 0 | 7.3 | 0 |
| TMR-2 | 2.0 | 2.0 | 1.5 |
| Polycat 41 | 0 | 0 | 0.5 |
| Dabco T-12 | 0 | — | 0.1 |
| CFC-11 | 20.0 | 25.0 | 0 |
| L-5421 | 2.0 | 2.0 | 0 |
| DC-5098 | 0 | 0 | 3.0 |
| Water | 0 | 0 | 4.4 |
| NCO/NH ratio | 5 | 5 | 3 |
| Reaction Profile | | | |
| Cream Time (sec) | 12 | 9 | 7 |
| Gel Time (sec) | — | 74 | 69 |
| Rise Time (sec) | 46 | 87 | ~90 |
| *Physical Properties | | | |
| Density, p.c.f. Kg/m³ | 2.61 (41.8) | 2.1 | 1.98 |
| K-Factor, BTU in/ft² hr °F. | | | |
| Initial | 0.155 | 0.161 | 0.182 |
| After 24 hrs. | — | 0.168 | 0.188 |
| After 1 week | 0.024 | 0.181 | 0.198 |
| Compressive Strength KPa (psi) | | | |
| Parallel to rise | 32.0 | 31.1 | 23.2 |
| Perpendicular to rise | 27.3 | 18.3 | 19.0 |
| C.I.I. | 1.2 | 1.7 | 1.2 |
| Flammability | | | |
| Butler Chimney (% wt. remained) | 87 | 81 | 74 |
| Oxygen Index | 23.5 | 24.5 | 22.0 |
| Friability (% wt. loss) | 10 | 21 | 20 |
| % Closed Cell | 81 | 81 | 59 |

What is claimed is:

1. A dimensionally stable, rigid urea-modified polyisocyanurate having substantially no urethane linkages and a density of between 0.5 and 20 pounds per cubic foot resulting from the reaction of a polyisocyanate selected from the group consisting of toluene diisocyanate, methylenediphenyl diisocyanate, polymeric (methylenediphenyl diisocyanate), and modified methylenediphenyl diisocyanate, and an aromatic disecondary diamine of formula

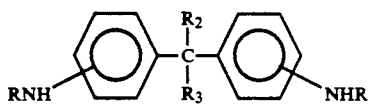

where R is selected from the group consisting of monovalent alkyl or alkenyl moieties having from 3 up to about 20 carbon atoms, and $R_2$, $R_3$ are independently selected from the group consisting of hydrogen or monovalent alkyl moieties with 1 to 3 carbon atoms, where the amount of aromatic disecondary diamine is such that the ratio of isocyanate moieties, NCO, of the polyisocyanate to secondary amino moieties, NH, of the aromatic disecondary diamine is from 1 up to about 9, said reaction performed in the presence of a catalyst inducing trimerization of said isocyanate to an isocyanurate.

2. The dimensionally stable, rigid urea-modified polyisocyanurate of claim 1 where R is a monovalent alkyl moiety having from 3 up to about 8 carbon atoms.

3. The dimensionally stable, rigid urea-modified polyisocyanurate of claim 1 where both $R_2$ and $R_3$ are hydrogen.

4. The dimensionally stable, rigid urea-modified polyisocyanurate of claim 1 where R is a monovalent alkyl moiety having from 3 up to about 8 carbon atoms and both $R_2$ and $R_3$ are hydrogen.

5. The dimensionally stable, rigid urea-modified polyisocyanurate of claim 2 where is a secondary butyl moiety.

6. The dimensionally stable, rigid urea-modified polyisocyanurate of claim 1 where the ratio NCO to NH is from about 3 up to about 7.

7. The dimensionally stable, rigid urea-modified polyisocyanurate of claim 1 further characterized in that said polyisocyanurate is formed in the presence of from about 0.1 up to about 6.0 parts water per 100 parts isocyanate as a blowing agent.

8. The dimensionally stable, rigid urea-modified polyisocyanurate of claim 1 further characterized by the aromatic diamine being a mixture of said diamine and an N,N'-dialkylphenylenediamine, where each alkyl group contains from 3 to 20 carbon atoms.

9. The dimensionally stable, rigid urea-modified polyisocyanurate of claim 1 having a density between 1.5 and 6.0 pounds per cubic foot.

10. A dimensionally stable, rigid urea-modified polyisocyanurate characterized by repeating units

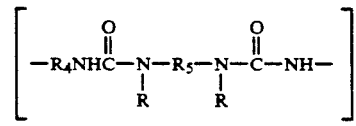

and

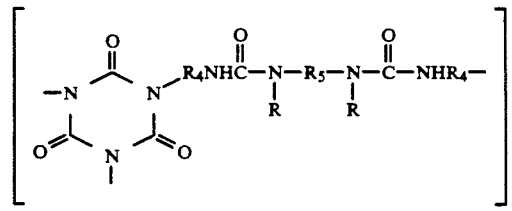

where R4 is such that OCN-R4-NCO is selected from the group consisting of 2,4-toluenediisocyanate, 2,6-toluenediisocyanate, 4,4'-diisocyanatodiphenylmethane, 2,4'-diisocyanatodiphenylmethane, polymeric diisocyanatodiphenylmethane and modified diisocyanatodiphenylmethane;

where R5 is such that RNHR5NHR is

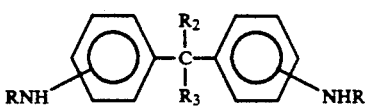

where R is a monovalent alkyl or alkenyl moiety containing from 3 to about 20 carbon atoms, or a monovalent aromatic moiety containing from 6 to about 10 carbon atoms, and R2, R3 are independently selected from the group consisting of hydrogen and alkyl moieties with 1 to 3 carbon atoms.

* * * * *